United States Patent
Gregory et al.

(10) Patent No.: US 11,770,643 B2
(45) Date of Patent: Sep. 26, 2023

(54) MACHINE-TRIGGERED HEALTH DATA COLLECTIONS WITH AUTOMATICALLY SET DELAY

(71) Applicant: KCF TECHNOLOGIES, INC., State College, PA (US)

(72) Inventors: Micah Dennis Gregory, State College, PA (US); Mark James Edwards, State College, PA (US)

(73) Assignee: KCF TECHNOLOGIES, INC., State College, PA (US)

( * ) Notice: Subject to any disclaimer, the term of this patent is extended or adjusted under 35 U.S.C. 154(b) by 37 days.

(21) Appl. No.: 17/672,252

(22) Filed: Feb. 15, 2022

(65) Prior Publication Data
US 2023/0262365 A1 Aug. 17, 2023

(51) Int. Cl.
*H04Q 9/00* (2006.01)
*G01M 99/00* (2011.01)

(52) U.S. Cl.
CPC ............ *H04Q 9/00* (2013.01); *G01M 99/005* (2013.01); *H04Q 2209/10* (2013.01); *H04Q 2209/84* (2013.01)

(58) Field of Classification Search
CPC .. H04Q 9/00; H04Q 2209/10; H04Q 2209/84; G01M 99/005
See application file for complete search history.

(56) References Cited

U.S. PATENT DOCUMENTS

| | | | |
|---|---|---|---|
| 6,563,122 B1 * | 5/2003 | Ludeker | G01N 21/6486 250/459.1 |
| 10,446,014 B1 * | 10/2019 | Tappan | G08B 25/001 |
| 2016/0105860 A1 * | 4/2016 | Li | H04W 72/30 370/350 |
| 2017/0296104 A1 * | 10/2017 | Ryan | G16H 50/30 |
| 2018/0177064 A1 * | 6/2018 | van Pol | G01N 29/02 |

\* cited by examiner

*Primary Examiner* — Ojiako K Nwugo
(74) *Attorney, Agent, or Firm* — MH2 TECHNOLOGY LAW GROUP LLP

(57) ABSTRACT

A low-powered sensor, a method for a low-powered sensor, and an apparatus are provided for monitoring a condition of a machine. Responsive to receiving a trigger signal during a setup phase, the low-powered sensor collects sensor data for a predetermined extended period of time. The low-powered sensor receives a setting of a delay based on a determined amount of time of the predetermined extended period of time, since the receiving of the trigger signal, for the machine to reach a steady operating condition within predetermined limits. Upon receiving the trigger signal after the receiving of the setting of the delay, the low-powered sensor waits a period of time of the set delay before collecting the sensor data for a predetermined amount of time that is shorter than the predetermined extended period of time, and provides the collected sensor data to a computing device for analysis.

20 Claims, 4 Drawing Sheets

US 11,770,643 B2

MACHINE-TRIGGERED HEALTH DATA COLLECTIONS WITH AUTOMATICALLY SET DELAY

TECHNICAL FIELD

This disclosure relates to monitoring of intermittently-operated machines via low-powered sensors. More particularly, this disclosure relates to the monitoring of intermittently-operated machines by using low-powered sensors that delay collection of sensor data after receiving a trigger signal.

BACKGROUND

Conventional machine health monitoring equipment such as, for example, vibration, electrical, pressure, and temperature sensors typically rely on internal timers to determine when to collect target health information. The health monitoring equipment typically operates based on regular recurring sensor sampling that may be adjustable based on user requirements. This type of timer-based operation works well for continuously operating, steady-state equipment such as, for example, fans, motors, pumps, compressors and other continuously-running equipment.

For equipment that is operated intermittently such as conveyors, bridge cranes, sump pumps, robots, etc., timer-based monitoring may not always produce useful information. For example, if a robotic arm takes three seconds to pick up and place an object and this action is repeated every 60 seconds, then useful information may be available only for about 5% of the duty cycle running time, and the monitored data may be collected during a 500 ms data collection every 10 minutes. Even if a collection time interval were to occur during some portion of movement of the robotic arm, if the collection time interval does not occur at a same relative time during every collection time interval, inconsistent data that is difficult to interpret will be produced, thereby making machine health judgments difficult, if not impossible.

SUMMARY

According to a first aspect of various embodiments, a low-powered sensor is provided for monitoring a condition of a machine. The low-powered sensor is configured to perform multiple operations. According to the operations, in response to receiving a trigger signal during a setup phase, the low-powered sensor collects sensor data for a predetermined extended period of time. A setting of a delay is received based on a determined amount of time of the predetermined extended period of time, since receiving the trigger signal, for the machine to reach a steady operating condition within predetermined limits. Upon receiving the trigger signal after the receiving of the setting of the delay, the sensor waits a period of time of the set delay before collecting the sensor data for a predetermined amount of time that is shorter than the predetermined extended period of time. The sensor provides the sensor data collected during the predetermined amount of time to a computing device for analysis.

According to a second aspect of various embodiments, a method is provided for a low-powered sensor to monitor a condition of a machine. According to the method, the low-powered sensor collects sensor data for a predetermined extended period of time in response to receiving a trigger signal during a setup phase. The low-powered sensor then receives a setting of a delay based on a determined amount of time of the predetermined extended period of time, since the receiving of the trigger signal, for the machine to reach a steady operating condition within predetermined limits. Upon receiving the trigger signal after the receiving of the setting of the delay, the low powered sensor waits a period of time of the set delay before collecting the sensor data for a predetermined amount of time that is shorter than the predetermined extended period of time, and provides the sensor data collected during the predetermined amount of time to a computing device for analysis.

According to a third aspect of various embodiments, an apparatus is provided. The apparatus includes multiple low-powered sensors in an intermittently-operated machine, and a machine health monitor having multiple trigger inputs and multiple ports, each of which is connected to a respective sensor of the multiple low-powered sensors. The machine health monitor is configured such that each of the multiple trigger inputs is associated with a corresponding port of the multiple ports. Multiple operations are configured to be performed. According to the operations, the machine health monitor receives a first trigger signal on a first trigger input of the multiple trigger inputs. The machine health monitor provides the first trigger signal to a first sensor of the multiple low-powered sensors via the corresponding port associated with the first trigger input. In response to receiving the first trigger signal via the corresponding port during a setup phase, the first sensor collects sensor data for a predetermined extended period of time. The first sensor then receives a setting for a delay based on a determined amount of time of the predetermined extended period of time, since the receiving of the first trigger signal, for the intermittently-operated machine to reach a steady operating condition within predetermined limits. Upon receiving, by the first sensor, the first trigger signal via the first trigger input after the receiving of the setting of the delay, the first sensor waits an amount of time of the set delay before collecting the sensor data for a predetermined amount of time that is shorter than the predetermined extended period of time, and provides the sensor data collected for the predetermined amount of time to the machine health monitor for reporting to a computing device for analysis.

BRIEF DESCRIPTION OF THE DRAWINGS

Generally, like reference numerals in the various figures are utilized to designate like components.

DETAILED DESCRIPTION

Figure 1:
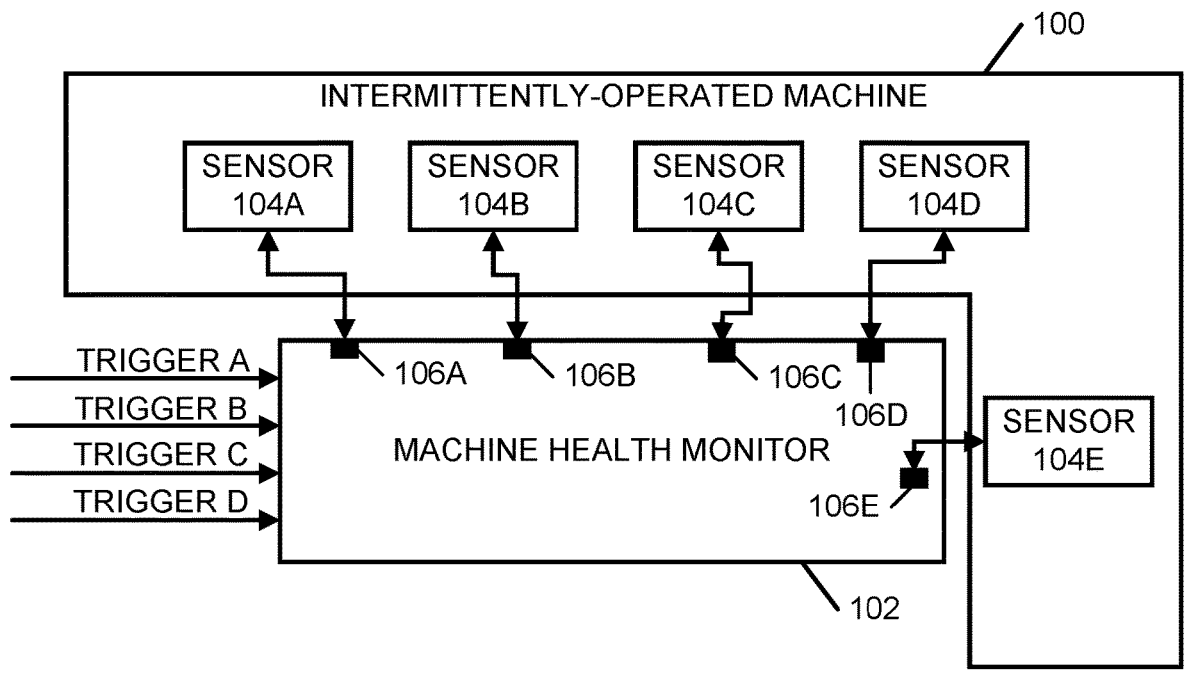
FIG. 1 illustrates an example environment in which embodiments may operate.

FIG. 1 illustrates an example environment in which various embodiments may operate. The environment may include an intermittently-operated machine 100 that may include low-powered sensors 104A, 104B, 104C, 104D, and 104E.

A machine health monitor 102 may receive a number of trigger inputs such as, for example, trigger A, trigger B, trigger C, and trigger D. Machine health monitor 102 may receive a trigger signal on any of the trigger inputs and may provide the trigger signal to one of ports 106A-106E associated with the trigger input on which the trigger signal was received. In some embodiments, trigger signals on the trigger inputs may be provided by a programmable logic controller (PLC), which also may provide machine control signals (not shown) to intermittently-operated machine 100. In other embodiments, the trigger signals may be provided on the trigger inputs by actuators or switches, or via other means.

Collected sensor data may be provided to machine health monitor 102 by any of sensors 104A-104E via a corresponding port of ports 106A-106E. Machine health monitor 102 may provide the collected sensor data to a computing device for analysis via a wired or wireless connection to a network. In some embodiments, the computing device may operate in a cloud computing environment.

Although FIG. 1 shows four trigger inputs, five low-powered sensors, and five ports, other embodiments may have more or fewer trigger inputs, low-powered sensors, and ports.

Figure 2:
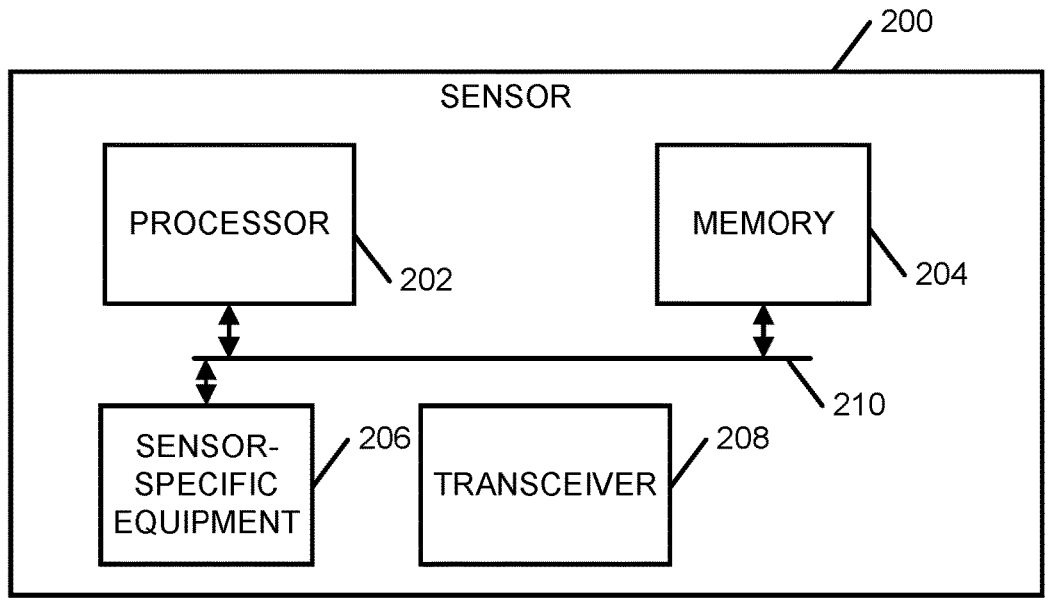
FIG. 2 is a functional block diagram of a sensor according to various embodiments.

FIG. 2 is a functional block diagram of a sensor 200 that may implement any of low-powered sensors 106A-106E. Sensor 200 may include one or more processors 202, a memory 204, a transceiver 208, sensor specific equipment 206 and a bus 210 connecting memory 204, transceiver 208, and sensor specific equipment 206 to one or more processors 202. Sensor specific equipment 206 may include serial communication hardware (e.g. RS-232, RS-422, RS-485 transceivers), indicators, and power circuitry.

Figure 3:
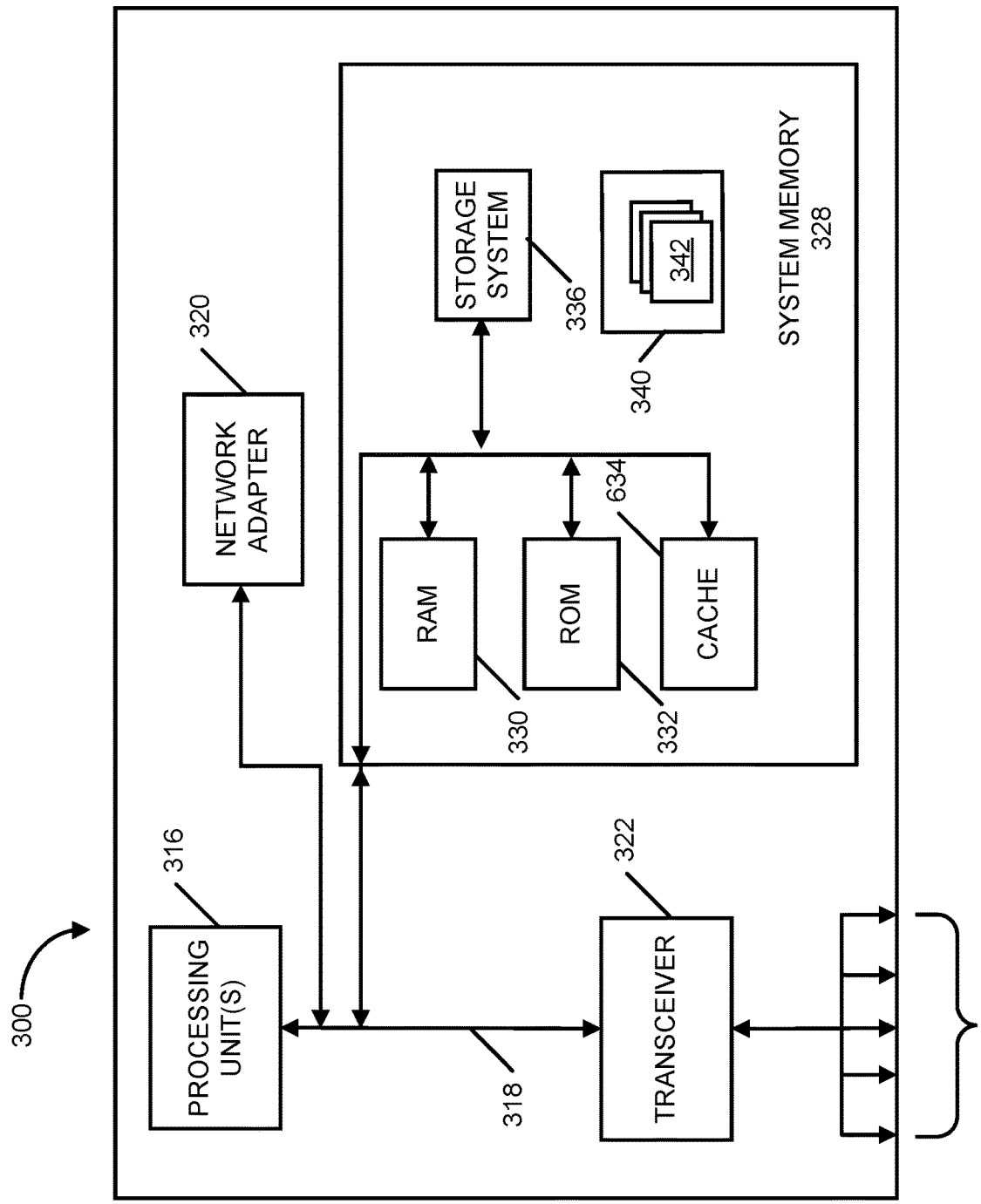
FIG. 3 is a functional block diagram of a machine health monitor according to various embodiments.

FIG. 3 is a functional block diagram of an example processing device 300 that may implement machine health monitor 102 according to various embodiments. Components of processing device 300 may include, but are not limited to, one or more processing units 316, a system memory 328, and a bus 318 that couples various system components including system memory 328 to one or more processing units 316.

Bus 318 represents any one or more of several bus structure types, including a memory bus or memory controller, a peripheral bus, an accelerated graphics port, and a processor or local bus using any of a variety of bus architectures. Such architectures may include, but not be limited to, Industry Standard Architecture (ISA) bus, Micro Channel Architecture (MCA) bus, Enhanced ISA (EISA) bus, Video Electronics Standards Association (VESA) local bus, Peripheral Component Interconnects (PCI) bus, and universal serial bus (USB).

Processing device 300 may include various computer system readable media, which may be any available non-transitory computer-readable media accessible by processing device 300. The computer-readable media may include volatile and non-volatile media.

System memory 328 may include non-transitory volatile memory, such as random access memory (RAM) 330 and cache memory 334. System memory 328 also may include non-transitory non-volatile memory including, but not limited to, read-only memory (ROM) 332 and storage system 336. Storage system 336 may be provided for reading from and writing to a non-removable, non-volatile magnetic medium, which may include a hard drive or a Secure Digital (SD) card. Each memory device may be connected to bus 318 by at least one data media interface. System memory 328 further may include instructions for processing unit(s) 316 to configure computing system 300 to perform functions of embodiments of the invention. For example, system memory 328 also may include, but not be limited to, processor instructions for an operating system, at least one application program, other program modules, program data, and an implementation of a networking environment.

Processing device 300 may communicate with one or more external devices including, but not limited to, sensors 106A-106E via transceiver 322. Processing device 300 can communicate with one or more networks including, but not limited to, a local area network (LAN), a general wide area network (WAN), a packet-switched data network (PSDN) and/or a public network such as, for example, the Internet, via network adapter 320. As depicted, network adapter 620 communicates with the other components of processing device 300 via bus 318.

It should be understood that, although not shown, other hardware and/or software components could be used in conjunction with processing device 300. Examples, include, but are not limited to, microcode, device drivers, and data archival storage systems, etc.

Figure 4:
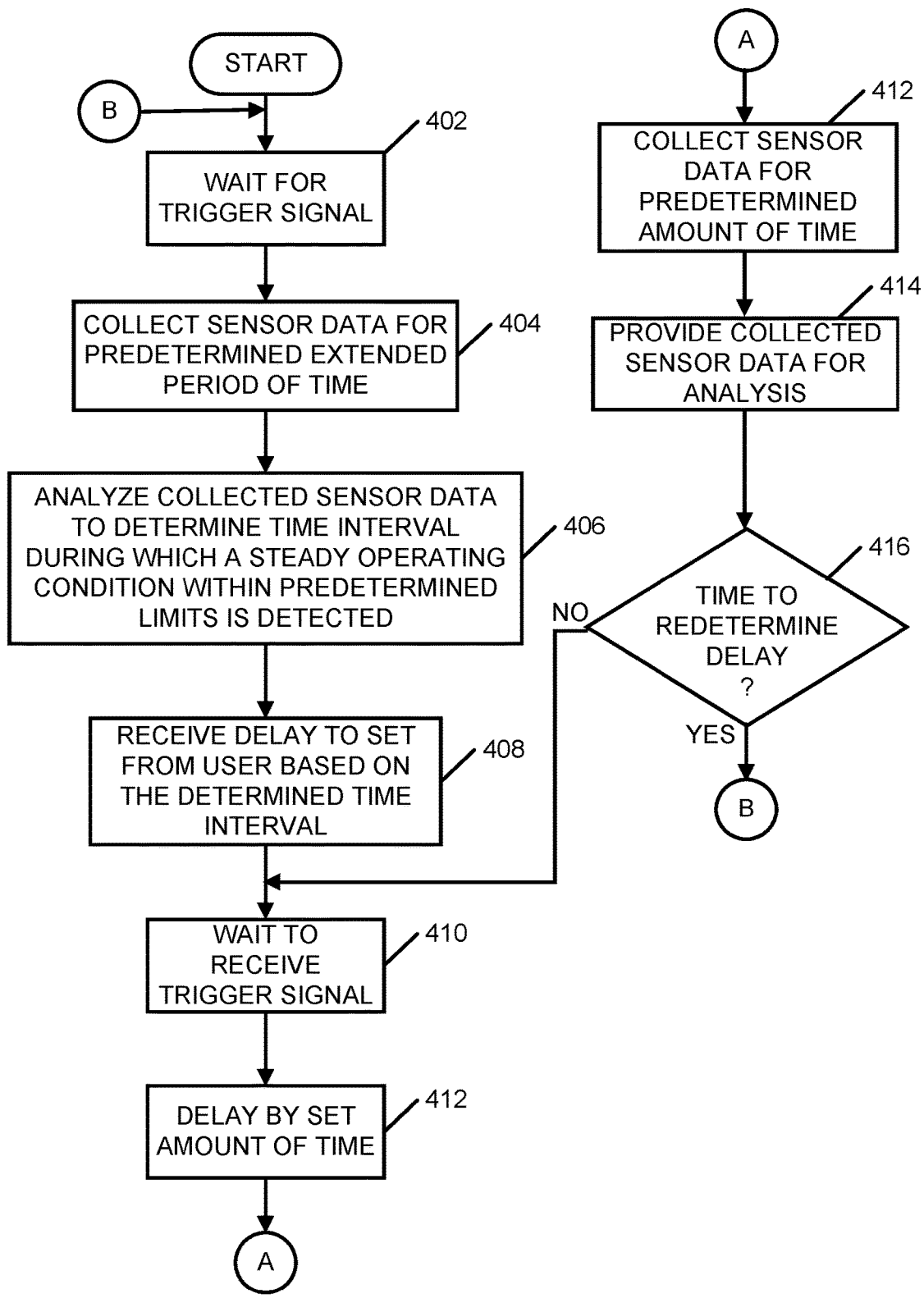
FIG. 4 is a flowchart of an example process for determining and setting an amount of time to delay after receiving a trigger signal and for delaying collection of sensor data for the determined amount of time after the trigger signal is received.

FIG. 4 is a flowchart of an example process that may be performed with respect to a received trigger signal and an associated sensor of sensors 106A-106E. The process may begin by waiting to receive a trigger signal while in a setup phase. The trigger signal may be received from a PLC, an actuator, a switch, or via other means (act 402). When a low-powered sensor receives the trigger signal, during act 402, the sensor collects sensor data for a predetermined extended period of time such as, for example, an amount of time up to about 120 seconds or another extended time period (act 404). A user then may analyze the collected sensor data to determine an amount of time from receipt of the trigger signal to a point at which a steady operating condition within the predetermined limits is reached and a length of time of the steady operating condition (act 406). For example, if the sensor is an accelerometer that measures vibration of a robot arm, the sensor measures increasing vibration while the robot arm is accelerating until the robot arm stops accelerating, at which point the sensor may detect a small amount of vibration within the predetermined limits. At this point in time, the robot arm may be considered to be in a steady operating condition and the sensor may collect sensor data. In some embodiments, the collected sensor data may be provided to a computing device for a user to analyze the collected sensor data.

Next, the user may set a delay, which the sensor receives (act 408). The received delay may be based on a user-determined amount of time to delay before a machine including the sensor reaches a steady operating condition. The setting of the delay ends the setup phase for the sensor. The sensor then may wait to receive a trigger signal (act 410). When the sensor receives the trigger signal, the sensor delays by the set amount of time delay (act 412) before collecting sensor data for a predetermined amount of time, which may be 10 seconds or another period of time during the steady operating condition within the predetermined limits (act 412). The sensor then may provide the collected sensor data to a computing device for analysis (act 414).

The sensor then may determine whether it is time to redetermine the delay in some embodiments (act 416). If the delay is not to be redetermined, then acts 410-416 may be repeated. Otherwise, processing may return to act 402 and the setup phase to set a new amount of time to delay when a trigger signal is later received while not in the setup phase. In various embodiments, the delay may be redetermined weekly, monthly, quarterly, or at another predetermined time interval.

In another embodiment, the process of FIG. 4 may be modified such that acts 402-404 are performed a predetermined number of times. A user may analyze collected data, during act 406 to determine a common time delay, from among the predetermined number of collected sensor data collected during act 404, at which a steady operating condition within predetermined limits is detected.

Figure 5:
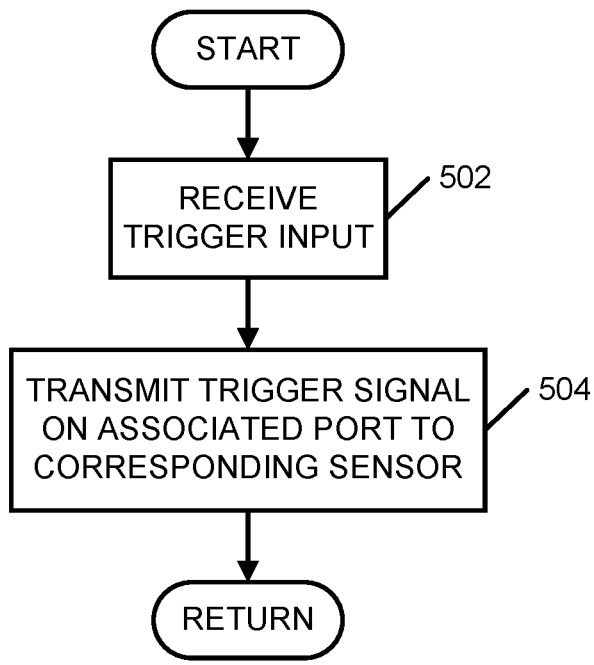
FIG. 5 is an example flowchart of a process performed by a machine health monitor for receiving a trigger input and transmitting a trigger signal on an associated port to a corresponding sensor according to various embodiments.

FIG. 5 is a flowchart of an example process that may be performed by machine health monitor 102 according to some embodiments. The process may begin with machine health monitor 102 receiving a trigger signal on one of a number of trigger inputs (act 502). Machine health monitor 102 then may transmit the trigger signal to one of sensors 106A-106E via a port associated with the one of the number of trigger inputs (act 504).

Figure 6:
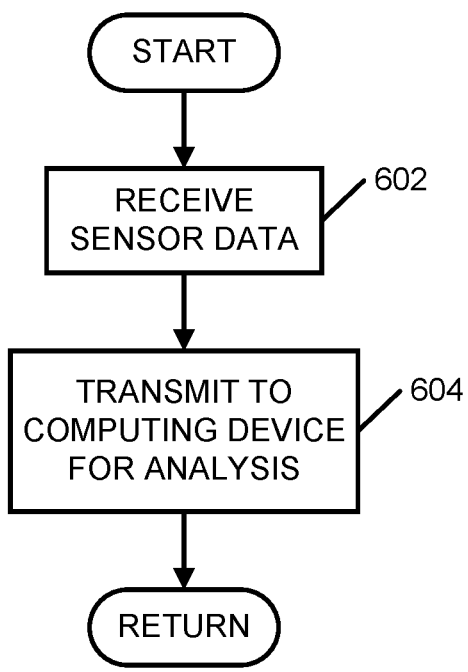
FIG. 6 is an example flowchart of a process performed by the machine health monitor for receiving sensor data and transmitting the sensor data to a computing device for analysis.

FIG. 6 is a flowchart of an example process that may be performed by machine health monitor 102 according to some embodiments. The process may begin with machine health monitor 102 receiving sensor data from one of sensors 106A-106E via one of a number of ports 106A-106E (act 602). Machine health monitor 102 then may transmit the received sensor data to a computing device for analysis (act 604). In some embodiments, the computing device may reside in a cloud computing environment.

Various embodiments collect and provide sensor data from an approximate same portion of a cycle of an intermittently-operated machine during which a steady operating condition within predefined limits had been reached. The various embodiments enable condition monitoring of equipment where use of traditional methods is impractical due to constraints inherent in interval-based data collection. The various embodiments work in harmony with intermittently-operated equipment that the embodiments are designed to monitor, thereby providing a significant improvement in fault detection capabilities. As a result, downtime is reduced, operating costs are lowered, and workplace safety is increased.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention are described herein with reference to flowchart illustrations and/or block diagrams of methods, apparatus (systems), and computer-readable storage devices having instructions stored therein for carrying out functions according to embodiments of the invention. It will be understood that each block of the flowchart illustrations and/or block diagrams, and combinations of blocks in the flowchart illustrations and/or block diagrams, can be implemented by computer readable program instructions. Each block in the flowchart or block diagrams may represent a module, segment, or portion of instructions, which comprises one or more executable instructions for implementing the specified logical function(s). In some alternative implementations, the functions noted in the blocks may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). The software and/or algorithms described above and illustrated in the flowcharts may be modified in any manner that accomplishes the functions described herein. In addition, the functions in the flowcharts or description may be performed in any order that accomplishes a desired operation.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The invention claimed is:

1. A low-powered sensor for monitoring a condition of a machine, wherein the low-powered sensor is configured to perform operations comprising:
responsive to receiving a trigger signal during a setup phase, collecting sensor data for a predetermined extended period of time;
receiving a setting of a delay based on a determined amount of time of the predetermined extended period of time, since the receiving of the trigger signal, for the machine to reach a steady operating condition within predetermined limits;
upon receiving the trigger signal after the receiving of the setting of the delay:
waiting a period of time of the set delay before collecting the sensor data for a predetermined amount of time that is shorter than the predetermined extended period of time, and
providing the sensor data collected during the predetermined amount of time to a computing device for analysis.

2. The low-powered sensor of claim 1, wherein:
the collecting of the sensor data for the predetermined extended period of time responsive to the receiving of the trigger signal is performed a plurality of times before the receiving of the setting of the delay.

3. The low-powered sensor of claim 2, wherein the determined amount of time is a determined common time period from a corresponding received trigger signal to a time when the machine had reached a respective steady operating condition within the predefined limits for each of the plurality of times.

4. The low-powered sensor of claim 1, wherein the operations further comprise:
after the receiving of the setting of the delay, performing after a predetermined interval of time:
responsive to receiving a new occurrence of the trigger signal, collecting new sensor data for the predetermined extended period of time,
and
receiving a new setting of the delay based on a new determined amount of the predetermined extended period of time, since the receiving of the new occurrence of the trigger signal, for the machine to reach the steady operating condition within the predetermined limits.

5. The low-powered sensor of claim 1, wherein the low-powered sensor is a sensor from a group of a vibration sensor, a current sensor, and a voltage sensor.

6. The low-powered sensor of claim 1, wherein the trigger signal is received from a programmable logic controller.

7. The low-powered sensor of claim 1, wherein the trigger signal is received as a result of toggling one of an actuator and a switch.

8. A method for a low-powered sensor to monitor a condition of a machine, the method comprising:
responsive to receiving a trigger signal during a setup phase, collecting, by the low-powered sensor, sensor data for a predetermined extended period of time;
receiving a setting, by the low-powered sensor, of a delay based on a determined amount of time of the predetermined extended period of time, since the receiving of the trigger signal, for the machine to reach a steady operating condition within predetermined limits;
upon receiving the trigger signal after the receiving of the setting of the delay:
waiting, by the low-powered sensor, a period of time of the set delay before collecting the sensor data for a predetermined amount of time that is shorter than the predetermined extended period of time, and
providing, by the low-powered sensor, the sensor data collected during the predetermined amount of time to a computing device for analysis.

9. The method of claim 8, wherein:
the collecting of the sensor data for the predetermined extended period of time responsive to the receiving of the trigger signal is performed a plurality of times before the receiving of the setting of the delay.

10. The method of claim 9, wherein the determined amount of time is a determined common time period from a corresponding received trigger signal to a time when the machine had reached a respective steady operating condition within the predefined limits for each of the plurality of times.

11. The method of claim 8, further comprising:
after the receiving of the setting of the delay, performing after a predetermined interval of time:
responsive to receiving a new occurrence of the trigger signal, collecting, by the low-powered sensor, new sensor data for the predetermined extended period of time,
and
receiving, by the low-powered sensor, a new setting of the delay based on a new determined amount of the predetermined extended period of time, since the receiving of the new occurrence of the trigger signal, for the machine to reach the steady operating condition within the predetermined limits.

12. The method of claim 8, wherein the low-powered sensor is a sensor from a group of a vibration sensor, a current sensor, and a voltage sensor.

13. The method of claim 8, wherein the low-powered sensor receives the trigger signal from a programmable logic controller.

14. The method of claim 8, wherein the low-powered sensor receives the trigger signal as a result of toggling one of an actuator and a switch.

15. An apparatus comprising:
a plurality of low-powered sensors included in an intermittently-operated machine;
a machine health monitor having a plurality of trigger inputs and a plurality of ports, each of the plurality of ports being configured to be connected to a respective sensor of the plurality of low-powered sensors, the machine health monitor being configured such that each of the plurality of trigger inputs is associated with a corresponding port of the plurality of ports, wherein the apparatus is configured to perform a plurality of operations comprising:
receiving, by the machine health monitor, a first trigger signal on a first trigger input of the plurality of trigger inputs,
providing, by the machine health monitor, the first trigger signal to a first sensor of the plurality of low-powered sensors via the corresponding port associated with the first trigger input;

responsive to receiving the first trigger signal via the corresponding port during a setup phase, collecting sensor data, by the first sensor, for a predetermined extended period of time;

receiving a setting, by the first sensor, of a delay based on a determined amount of time of the predetermined extended period of time, since the receiving of the first trigger signal, for the intermittently-operated machine to reach a steady operating condition within predetermined limits;

upon receiving, by the first sensor, the first trigger signal via the first trigger input after the receiving of the setting of the delay:
   waiting, by the first sensor, an amount of time of the set delay before collecting the sensor data for a predetermined amount of time that is shorter than the predetermined extended period of time, and
   providing, by the first sensor, the sensor data collected during the predetermined amount of time to the machine health monitor for reporting to a computing device for analysis.

16. The apparatus of claim 15, wherein:
the collecting of the sensor data for the predetermined extended period of time responsive to the receiving of the first trigger signal is performed a plurality of times before the receiving of the setting of the delay.

17. The apparatus of claim 16, wherein the determined amount of time is a determined common time period from a corresponding received first trigger signal to a time when the intermittently-operated machine had reached a respective steady operating condition within preset limits for each of the plurality of times.

18. The apparatus of claim 15, wherein each of the plurality low-powered sensors is a sensor from a group of a vibration sensor, a current sensor, and a voltage sensor.

19. The apparatus of claim 15, wherein the first trigger signal is received from a programmable logic controller.

20. The apparatus of claim 15, wherein the first trigger signal is generated as a result of toggling one of an actuator and a switch.

\* \* \* \* \*